(12) United States Patent
Hooley et al.

(10) Patent No.: US 8,691,095 B2
(45) Date of Patent: Apr. 8, 2014

(54) HIGH EFFICIENCY WATER PURIFICATION SYSTEM

(75) Inventors: Joseph Hooley, Cleveland, OH (US);
William E. Kovacs, Cleveland, OH (US)

(73) Assignee: Water Intellectual Properties, Inc., Cleveland, OH (US)

(*) Notice: Subject to any disclaimer, the term of this patent is extended or adjusted under 35 U.S.C. 154(b) by 0 days.

(21) Appl. No.: 13/337,522

(22) Filed: Dec. 27, 2011

(65) Prior Publication Data

US 2012/0145636 A1   Jun. 14, 2012

Related U.S. Application Data

(63) Continuation-in-part of application No. 12/964,874, filed on Dec. 10, 2010.

(51) Int. Cl.
| | | |
|---|---|---|
| B01D 61/00 | (2006.01) | |
| B01D 63/00 | (2006.01) | |
| B01D 35/00 | (2006.01) | |
| B01D 61/04 | (2006.01) | |
| B01D 61/02 | (2006.01) | |
| C02F 1/44 | (2006.01) | |
| B01D 61/58 | (2006.01) | |

(52) U.S. Cl.
CPC ............. *B01D 61/04* (2013.01); *B01D 61/025* (2013.01); *C02F 1/441* (2013.01); *B01D 61/58* (2013.01)
USPC ........ 210/652; 210/90; 210/195.2; 210/257.2

(58) Field of Classification Search
CPC .... B01D 61/025; B01D 61/022; B01D 61/12; B01D 2321/16; B01D 2317/022; B01D 61/18; B01D 2317/027; B01D 2317/06; B01D 2319/02; B01D 2319/022; B01D 9/00; B01D 2311/16; C02F 1/441
USPC ........ 210/652, 641, 195.2, 257.2, 500.38, 90, 210/636, 97, 102, 106
See application file for complete search history.

(56) References Cited

U.S. PATENT DOCUMENTS

| | | | | |
|---|---|---|---|---|
| 4,198,293 A | * | 4/1980 | Ogawa et al. | 210/636 |
| 4,277,344 A | * | 7/1981 | Cadotte | 210/654 |
| 4,321,137 A | * | 3/1982 | Kohler | 210/137 |
| 4,342,651 A | * | 8/1982 | Ahrens | 210/636 |
| 4,574,049 A | * | 3/1986 | Pittner | 210/639 |
| 4,983,305 A | * | 1/1991 | Oklejas et al. | 210/642 |
| 5,047,154 A | * | 9/1991 | Comstock et al. | 210/636 |
| 5,393,433 A | * | 2/1995 | Espenan et al. | 210/650 |
| 5,501,798 A | | 3/1996 | Al-Samadi et al. | |
| 5,900,151 A | * | 5/1999 | Thorsen et al. | 210/652 |

(Continued)

*Primary Examiner* — Ana Fortuna
(74) *Attorney, Agent, or Firm* — John D. Gugliotta

(57) ABSTRACT

A high efficiency water purification system is provided incorporating recovery of a portion concentrate wastewater associated with the reverse osmosis unit. This reduces the overall volume of concentrate wastewater requiring discharge/disposal by reusing the purified concentrate of a concentrate recovery units as RO feed water. Initial feedwater is pressurized and passed through an RO membrane, and separated into a permeate flow and a concentrate flow. A portion of the higher pressure concentrate is then directed to an additional set of thin film composite membranes (concentrate recovery membranes). The concentrate recovery membranes are arranged in an array such that the concentrate pressure is adequate to provide the force required to drive the concentrate through the recovery system membranes. The permeate produced by the concentrate recovery system is directed back to the feed of the primary RO unit; thereby, reducing the volume of raw feed water required for system operation.

17 Claims, 10 Drawing Sheets

(56) References Cited

U.S. PATENT DOCUMENTS

| | | | |
|---|---|---|---|
| 5,997,745 A * | 12/1999 | Tonelli et al. | 210/652 |
| 6,113,797 A | 9/2000 | Al-Samadi | |
| 6,139,740 A * | 10/2000 | Oklejas | 210/321.66 |
| 6,187,200 B1 | 2/2001 | Yamamura et al. | |
| 6,190,558 B1 * | 2/2001 | Robbins | 210/652 |
| 6,334,955 B1 * | 1/2002 | Kawashima et al. | 210/636 |
| 6,398,965 B1 | 6/2002 | Arba et al. | |
| 6,406,624 B1 * | 6/2002 | DeVos | 210/208 |
| 6,406,626 B1 * | 6/2002 | Murakami et al. | 210/500.38 |
| 6,461,514 B1 * | 10/2002 | Al-Samadi | 210/652 |
| 6,468,431 B1 * | 10/2002 | Oklelas, Jr. | 210/652 |
| 6,508,936 B1 | 1/2003 | Hassan | |
| 6,508,937 B1 * | 1/2003 | Kawashima et al. | 210/652 |
| 6,702,944 B2 * | 3/2004 | Husain et al. | 210/636 |
| 6,783,682 B1 | 8/2004 | Awerbuch | |
| 6,837,381 B2 * | 1/2005 | Hirose | 210/490 |
| 6,868,309 B1 * | 3/2005 | Begelman | 700/273 |
| 6,881,336 B2 | 4/2005 | Johnson | |
| 7,114,511 B2 | 10/2006 | Lull et al. | |
| 7,510,658 B2 * | 3/2009 | Gordon | 210/652 |
| 8,137,539 B2 * | 3/2012 | Gilron et al. | 210/96.2 |
| 2003/0141250 A1 * | 7/2003 | Kihara et al. | 210/652 |
| 2005/0006295 A1 | 1/2005 | Bharwada | |
| 2006/0231491 A1 | 10/2006 | Mukhopadhyay | |
| 2007/0181473 A1 * | 8/2007 | Manth et al. | 210/137 |
| 2008/0179242 A1 * | 7/2008 | Mukhopadhyay | 210/627 |
| 2008/0290033 A1 * | 11/2008 | Kimball et al. | 210/652 |
| 2009/0314712 A1 * | 12/2009 | Skou | 210/636 |
| 2010/0032375 A1 | 2/2010 | Jagannathan et al. | |
| 2011/0147310 A1 * | 6/2011 | Ito et al. | 210/652 |
| 2012/0205307 A1 * | 8/2012 | Boudinar | 210/636 |

* cited by examiner

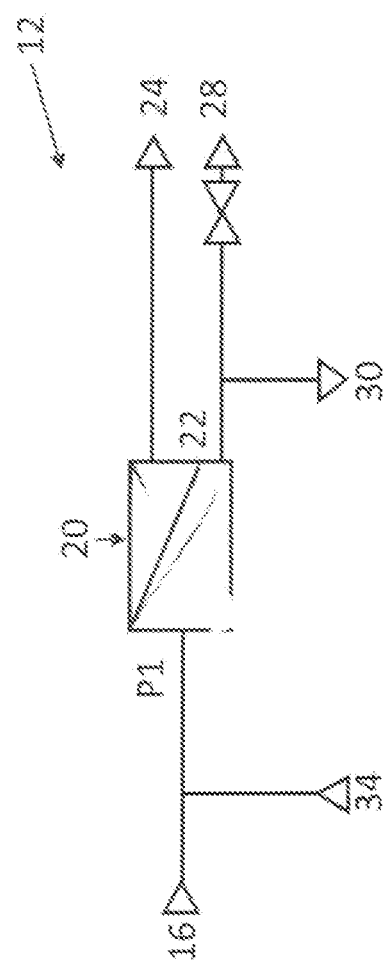

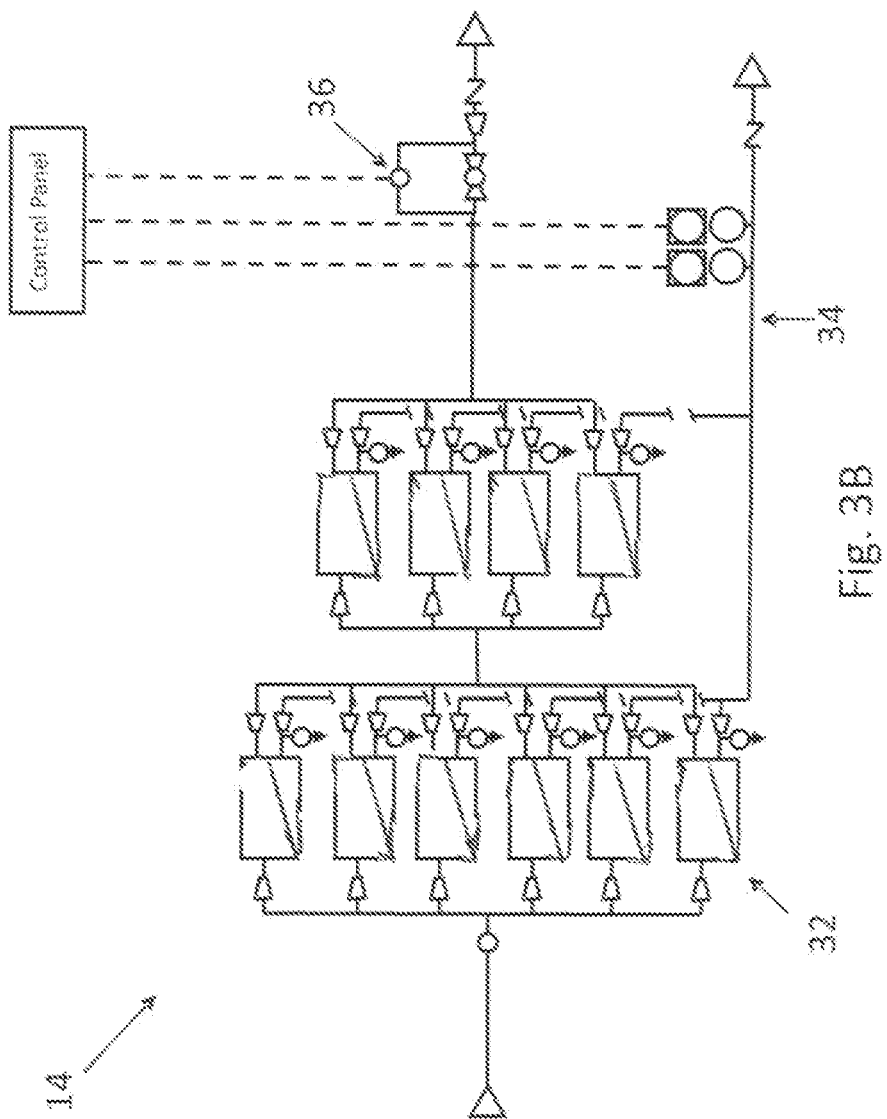

HIGH EFFICIENCY WATER PURIFICATION SYSTEM

RELATED APPLICATIONS

The present application is a Continuation in Part of U.S. Ser. No. 12/964,874 filed on Dec. 10, 2010, pending.

BACKGROUND OF THE INVENTION

1. Field of the Invention

The present invention relates generally to water purification systems for general industrial usage and, more particularly, to a reverse osmosis recovery systems that incorporate recoveries in excess of 85% or utilizing a secondary recovery on the concentrate.

2. Description of the Related Art

Virtually all large municipal water supply systems must treat their water in accordance with an extensive regime of global, federal and state agency regulations. Generally, water treatment occurs before the product reaches the consumer, and then again afterwards (when it is discharged). Water purification usually occurs close to the final delivery points to reduce pumping costs and the chances of the water becoming contaminated after treatment.

Traditional surface water treatment plants generally consists of three steps: clarification, filtration and disinfection. Clarification refers to the separation of particles (dirt, organic matter, etc.) from the water stream. Chemical addition (i.e. alum, ferric chloride) destabilizes the particle charges and prepares them for clarification either by settling or floating out of the water stream. Sand, anthracite or activated carbon filters refine the water stream, removing smaller particulate matter. While other methods of disinfection exist, the preferred method is via chlorine addition. Chlorine effectively kills bacteria and most viruses and maintains a residual to protect the water supply through the supply network.

Increasingly in recent years, water conservation has placed additional pressures on municipal water systems. The goals of water conservation efforts include: Sustainability; Energy Conservation; and Habitat Conservation. Sustainability is generally identified as limiting the withdrawal of fresh water from an ecosystem to a limit that does not exceed its natural replacement rate. Energy conservation is achieved through decreased need for water pumping, delivery, and wastewater treatment. In some regions of the world water purification and treatment consumes a significant amount of energy, (such as, for example, California, where over 15% of total electricity consumption is devoted to water management). Habitat conservation is achieved through minimizing human water use in order to help preserve fresh water habitats for local wildlife and migrating waterfowl.

While the goals of water conservation efforts at a macro level have justifiable economic benefits, in relation to a single municipal water system the result of water conservation efforts can often inevitably lead to increased per unit cost of production. The development and operation of fixed infrastructure over a small demand footprint can lead to, and has led to, significant increases in the cost of purified municipal water and the cost of wastewater sewer charges. While changes in such cost structures may not extremely effect individual residential users, industrial water users see significant effects to the operation of their facilities. Aside from just the cost of the commodity or services, which can double or triple in cost within a short period, limitations placed on an overall water balance within an aquifer can lead to limits on intake and discharge. While the residential user can merely forgo watering the lawn or washing the car, in such situations the industrial user can face production cuts, or limitations in industrial output. In such scenarios, the only way to increase output would be to increase efficiency of processing (or decrease of waste product).

Increased efficiency of water processing can result in a solution that may be effective to a specific process or process stream. Example include saltwater desalination, brine recovery in mine reclamation, or similar situations having specific product or process train requirements. However, such solutions tend to stay site specific and do not share a generally applicable benefit. Developing a general method for improving water purification efficiency must taking into account that water can containing a variety of hardness compounds such as barium, calcium, magnesium, iron, silica, carbonate and bicarbonate, fluoride and sulfate. And, variations in hardness can be commonly found in surface water supplies such as lakes and rivers as well as underground water supplies such as water wells and aquifers and as aqueous industrial effluents and landfill leachates.

Such water is frequently purified by using water softeners in the form of "ion exchange resins", chemical softeners using the cold lime or hot lime softening process, reverse osmosis and nanofiltration membranes and/or distillation. Most industrial users need purified water containing low to very low concentrations of hardness compounds and of soluble inorganic compounds in order to supply their cooling towers, low-pressure and high pressure boilers, heat exchangers and various process uses. The pharmaceutical and electronics industry users, as well as hospitals and laboratories, require high purity waters which are almost completely free from inorganic compounds. The water purification processes listed above involve transferring the soluble water impurities to a resin bed which must be regenerated and/or disposed of at high cost. Further, adding a large quantity of chemicals can generate a considerable volume of chemical waste in the case of lime softening. In the case of state-of-the-art RO and NF membrane processes, usage of reverse osmosis (RO) or nanofiltration (NF) membranes generates substantial volumes of concentrates which must be treated further or disposed of at a large cost. And, in the case of distillation, very high capital and/or operating costs exist.

Although membrane filtration processes such as reverse osmosis (RO) or nanofiltration (NF) have provided an effective and economically viable means for purifying water, these membrane processes in their current form are limited in the percentage of purified water produced, known as permeate or product recovery. Reverse Osmosis utilizes a thin film composite membrane to remove dissolved salts from a feed water source. Since most of the soluble compounds are separated and concentrated into a smaller volume, typically 25-50% (and sometimes as much as up to 75%) of the volume of the original water source becomes permeate. Water passes through the membrane, while most of the dissolved salts do not pass through the membrane. As such, the membrane concentrate volume is too large and costly to dispose of, except in seawater desalination where the concentrate stream (also known as the reject stream) is returned to sea and in some other applications where there are no regulatory limits on the quantity of the reject stream discharged or the concentration of inorganic compounds contained therein.

Additionally, the main reason why further recovery of purified water from RO or NF membranes is not possible is the tendency of scale to form on the surface of the membranes as the concentration of scale-forming compounds and sparingly soluble salts is increased beyond their saturation values. This deposition of scale frequently results in a loss of purified water production (also known as loss of permeate flux through the membrane) and the eventual need for costly replacement of the membranes.

Typically, Reverse Osmosis (RO) systems operate as a cross-flow filter were a portion of the feed water passes through the RO membrane (typically 75%) and a portion is discharged as a wastewater (25%). The feed water is pressurized (typically below the rating of standard pressure vessels, between 100-600 psig, depending on backpressure) (P-1) to provide the force required to drive the water through the RO membrane. The driving force required to produce a given volume of permeate is dependent upon the feed water salt concentration and water temperature. After passing through the membrane, permeate is typically at fairly low pressure 10-100 psig (P-3), while the concentrate remains at much higher pressure typically 100-600 psig (P-2). A control valve (V-1) is utilized to adjust the concentrate flow and also reduce the concentrate pressure suitable for discharge.

A disadvantage of the reverse osmosis process is the recovery is typically limited to 60-80% as calculated by Equation 1:

Percent Recovery=[(Feed water−Permeate)×100]/
Feed water       [Eq. 1]

As the cost of city water and wastewater disposal increases, minimizing the feed water and concentrate volume is of interest to many RO system operators. The use of chemical additives in the water supply such as acids to reduce the pH and inorganic or organic anti-scalant compounds is practiced in the water treatment and membrane industry in order to provide some improvement in the water recovery and prevent scale formation. However, such improvement is only of limited extent since no anti-scalant is effective for all the contaminants and therefore they do not provide economically viable options for treatment of the entire water stream.

A search of the prior art for a solution to the problem did not disclose any patents that read directly on the claims of the instant invention. However, in the parent application U.S. Ser. No. 12/964,874 by the present inventors and incorporated by reference herein as if fully rewritten, an apparatus and method is provided for maintaining reverse osmosis recovery in excess of 70-80% on a continue basis and without the need for additional energy input (i.e. though additional pump-supplied or pressure) between various stages. While such an apparatus and method provide for an improved water purification system for general industrial usage and may be incorporated in or overlap with the present invention, it has been found that additional adaptations, modifications and improvements, but still based upon such core technology, are preferable extensions under specialized conditions outside the median of most general industrial usages or under such conditions where optimization of such a high efficiency water purification system for specific operational variables is desired.

SUMMARY OF THE INVENTION

It is therefore an object of the present invention to provide an improved water purification systems for general industrial usage.

It is a feature of the present invention to allow for the processing of a convention municipal water feedstock with a reverse osmosis recovery systems that incorporate recoveries in excess of 80% by utilizing a secondary recovery on the concentrate.

Briefly described according to the present invention, a process to recover a portion of the concentrate wastewater associated with the reverse osmosis unit is provided that reduces the overall volume of concentrate wastewater requiring discharge/disposal by reusing the purified concentrate of a concentrate recovery units as RO feed water. The initial feed water inlet (anticipated as being from a municipal water source, industrial water source or tertiary water source) is pre-treated in an otherwise conventional manner as would be done for any RO operation (by filtering and otherwise removing materials known to be detrimental to RO membrane operation). The feed water inlet is then pressurized and passed through an RO membrane, and separated into a permeate flow and a concentrate flow. After passing through the membrane, the permeate is generally at a very lower pressure, while the concentrate remains at a much higher pressure. A portion of the higher pressure concentrate is then directed to an additional set of thin film composite membranes (concentrate recovery membranes). The concentrate is drawn from the primary RO unit upstream of a concentrate flow control valve where the pressure is typically 100-600 psig. The concentrate recovery membranes are arranged in an array such that the concentrate pressure is adequate to provide the force required to drive the concentrate through the recovery system membranes. The permeate produced by the concentrate recovery system is directed back to the feed of the primary RO unit; thereby, reducing the volume of raw feed water required for system operation. The concentrate flow rate is controlled by a second flow control valve and is discharged as a wastewater. The concentrate recovery system is operated at 30-60% recovery depending on the feed water characteristics. The recovery is limited by sparingly soluble salts which can foul the reverse osmosis membranes.

In accordance with a preferred embodiment, the concentrate recovery unit utilizes pressure that is available as part of the normal operating parameters of the primary RO unit. As such, additional energy is not required for the recovery process.

An advantage of the present invention is that such a concentrate recovery system can be retrofitted onto existing RO units, as well as incorporated on new RO installations.

While the preferred embodiment of the present invention ins disclosed in the context of high efficiency water purification systems in general industrial usage, those skilled in the art will appreciate that the principles of the present invention may be applied so as to provide alternate systems based on the principles described herein.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2a is a process flow schematic of an exemplary reverse osmosis unit 12 for use in conjunction with the preferred embodiment of the present invention;

FIG. 3b is a detailed process flow diagram for the a first alternate embodiment of a concentrate recovery unit 14 for use in conjunction with the preferred embodiment shown in FIG. 1 of the preferred invention;

DESCRIPTION OF THE PREFERRED EMBODIMENTS

Figure 1:
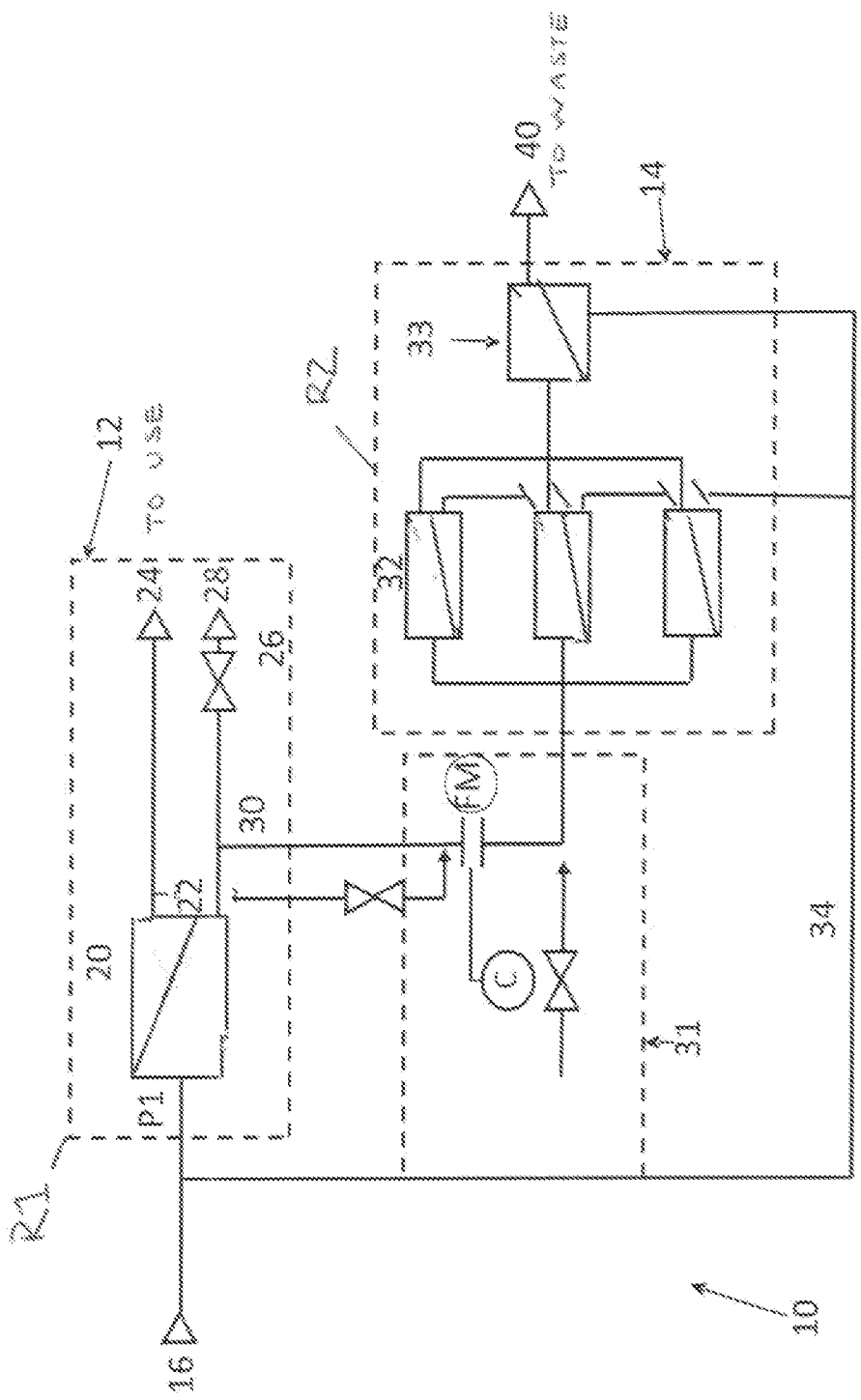
FIG. 1 is process flow schematic of an exemplary concentrate recovery revers osmosis system according to the preferred embodiment of the present invention.

Example systems, methods, processes, and so on are now described. In the following description, for purposes of explanation, numerous specific details are set forth in order to facilitate thoroughly understanding the methods, systems, processes, and so on. It may be evident, however, that the methods, systems and so on can be practiced without these specific details. In other instances, well-known structures and devices are shown in block diagram form in order to simplify description.

As used in this application, the term "semi-permeable membrane" or "polyamide membrane" refers to thin film composite membranes such as reverse osmosis (RO) or nanofiltration (NF) membranes used to purify water, the soluble inorganic ions such as sodium, potassium, calcium, magnesium, iron, chloride, fluoride, carbonate, bicarbonate, sulfate and silica are separated by the membrane while the water is allowed to permeate or pass through the membrane. These thin film composite membranes generally consist of three layers: a polyester support web; a micro porous polysulfone inner layer; and an ultra thin polyamide barrier layer on the top surface. As used in this application, the invention does not rely exclusively on any specific type or brand of semi-permeable membrane, but rather broadly on the use of any such existing or newly developed reverse osmosis recovery systems that utilize a secondary recovery on the concentrate to achieve recoveries in excess of 80%. Membrane designs can be spirally-wound low pressure or "brackish water" RO membranes, spirally-wound "high pressure" or "seawater" RO membranes, or plate and frame or disc-type membranes. As should be obvious to a person having ordinary skill in the relevant art, with hindsight of the present teachings, to incorporate of newly developed membranes within such systems.

As used in this application, the term "hardness" of water indicates the presence of water soluble monovalent and multivalent ions in solution. Monovalent ion refers generally to ions having a valency of one and is used generally to refer to ions such as sodium, potassium, cesium, chloride, fluoride, nitrate and other monovalent cations of the periodic table. Multivalent ions refers generally to ions having a valency of two or more, and is used generally to refer to ions such as carbonate, phosphate, silicate, sulfate, aluminum, barium, calcium, magnesium, strontium, chromium, copper, lead, nickel, silver, tin, titanium, vanadium, zinc and other multivalent cations of the periodic table. The removal of "hardness" form water is typically referred to as the separation of multivalent ions from the water, or the prevention of the passage of multivalent ions through a barrier, while allowing monovalent ions such as sodium, potassium, cesium, chloride, fluoride, nitrate and other monovalent ions to remain within the water or otherwise permeate through the barrier. Typically, the water solubility of these hardness ions, when combined with certain monovalent, divalent or multivalent anions such as fluoride, carbonate, hydroxide, phosphate and sulfate (i.e. calcium fluoride, calcium or magnesium carbonate, calcium or magnesium silicate, calcium sulfate) is rather low when compared to compounds of monovalent cations such as sodium chloride, sodium carbonate or sodium sulfate. These compounds of multivalent cations are therefore termed "sparingly soluble compounds" and such term will be used in the present invention.

The best mode for carrying out the invention is presented in terms of its preferred embodiment, herein depicted within the Figures.

1. Detailed Description of the Figures

Referring to FIG. 1 is process flow diagram of an exemplary concentrate recovery reverse osmosis system, generally noted as 10, according to the preferred embodiment of the present invention. The system 10 includes a primary reverse osmosis unit 12 in fluid communication with at least one concentrate recovery unit 14.

Figure 2B:
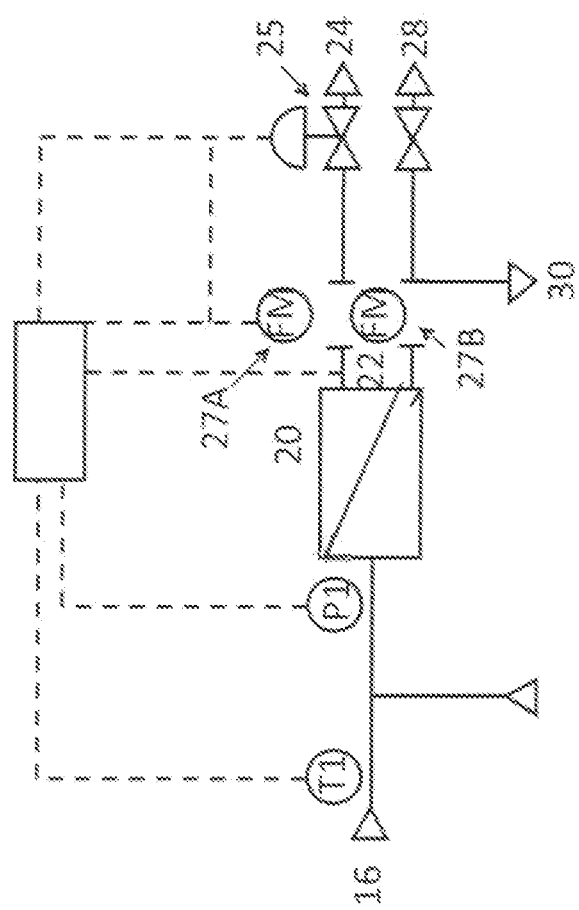
FIG. 2b is a process flow schematic of an exemplary reverse osmosis unit 12 for use in conjunction with a first alternate embodiment of the present invention I which a primary permeate restriction is modulated or otherwise controlled in a manner that is proportional to temperature or inversely proportional to temperature of the inlet feedwater 16.
Figure 5:
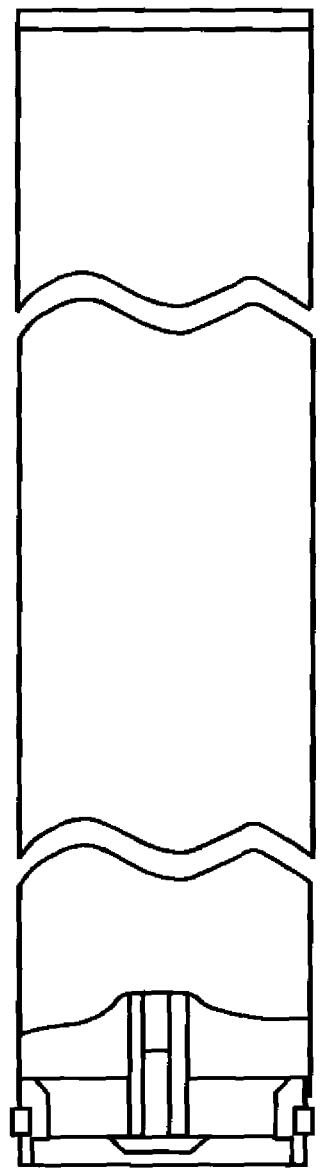
FIG. 5 is a schematic representation of a typical thin film composite member 20 of a type currently available in the PRIOR ART and capable of being used in conjunction with the present invention.
Figure 6A:
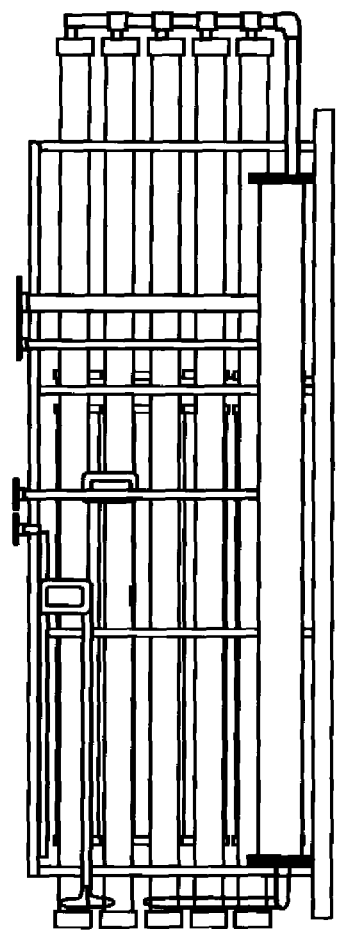
FIG. 6A is a front elevational view of an exemplary configuration for a high efficiency water purification system reverse osmosis array incorporating the teachings, features and benefits of the preferred embodiment of the present invention.
Figure 6B:
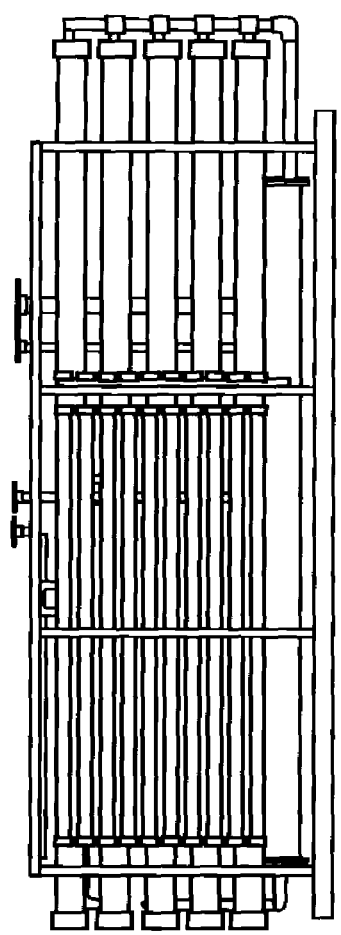
FIG. 6B is a rear elevational view thereof.
Figure 6C:
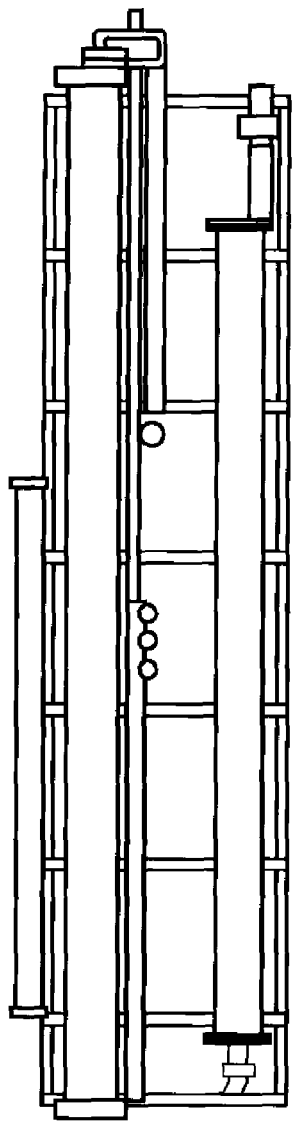
FIG. 6C is a top plan view thereof.
Figure 6E:
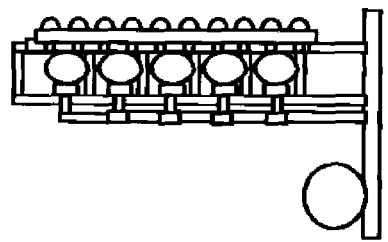
FIG. 6E is a right side elevational view thereof.
Figure 6D:
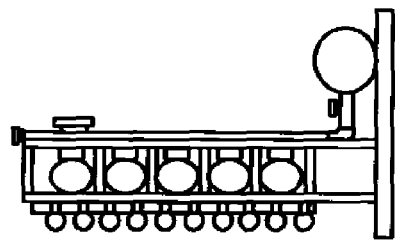
FIG. 6D is a left side elevational view thereof.

While not a novel element of the present system, it is anticipated that any feed water inlet 16 could be of any municipal source, industrial source, or tertiary source that could be subject to pretreatment by any suitable means which will efficiently separate suspended solids and prevent premature fouling and "surface blinding" of the membranes downstream. As shown in conjunction with FIG. 2a, an exemplary primary reverse osmosis unit 12 is used of any otherwise conventional type for use in water purification that utilizes a thin film composite membrane 20 to remove dissolved salts from the pretreated feed water source 16. For purposes of providing enablement of the preferred embodiment of the present invention sufficient to teach a person having ordinary skill in the relevant art how to practice the features and functions of the present invention, it is anticipated that a thin film composite membrane 20 similar to that provided by The Dow Chemical Company ("DOW®") under the current brand name FILMTEC™ may be utilized as generally shown in FIG. 5. It will become equally aware to the person having ordinary skill in the relevant art that the use of reverse osmosis membrane sheet having such qualities and specifications would be a design choice capable of modification or replacement based upon equivalent functionality of alternate sources or suppliers, unique industrial performance requirements or conditions, newly available devices or technologies, or the like. In utilizing such proprietary brand thin film composite membranes, the computerized modeling of such membrane performance under varying operational conditions can be an important tool in making design decisions on system configuration. One such tool that is well known to those users of DOW® FILMTEC™ reverse osmosis membranes is a ROSA (Reverse Osmosis System Analysis) design software. This ROSA design software is constantly updated and evolved to meet system design needs under new operational requirements or configurations. Given the inclusion of broad functional equivalents, it is intended that water passes through the membrane 20, while most of the dissolved salts do not pass through the membrane. It is understood that these conditions, in addition to other operational configurations anticipated within the present disclosure, may used to modify existing ROSA design software parameters. In an exemplary embodiment of such an previously unanticipated design criteria, the Reverse Osmosis (RO) systems 12 operate as a cross-flow filter were a portion of the feed water passes through the RO membrane 20, typically 75%, and a portion is discharged as a wastewater, typically 25%. (It should be noted that current functionality of ROSA design software would require separate design calculations for each primary or secondary recovery, and a final design estimation would require an iteration of such conditions). It would be obvious to a person having ordinary skill in the relevant art, in hindsight light of the present teachings, to utilize any functionally equivalent system as a replacement therefore, with such a replacement being considered equivalent to the present innovation. The concentrate 22 contains the soluble salts that can not pass through the membrane 20. The permeate 24 passes through the membrane 20 and is relatively pure water.

The feed water 16 is pressurized to a level that is selected as a design criteria for overall operation of the systems 10 and membrane 20. While such a feedwater pressure P1 is typically between 100-600 psig, and preferably between 200-400 psig, the present invention is not dependant on any exact pressure range being used but merely utilizes a feedwater pressure P1 to provide the force required to drive the water through the RO membrane 20 with sufficient driving force to produce a given volume of permeate 24. It is anticipated that this pressure P1 is dependent, at least, upon the feed water salt concentration, water temperature, backpressure requirements, etc. However, at any pressure P1, after passing through the membrane 20 the permeate pressure P3 is typically fairly low, such as between approximately 20-40 psig, while the concentrate pressure P2 remains much higher, such as between approximately 100-600 psig, and preferably 200-300 psig, given this particular example. A control valve 26 is utilized to adjust the final concentrate flow 28 and also reduce the final concentrate pressure suitable for discharge.

While such a preferred embodiment is adaptable for many general industrial conditions, it is known that in most geographic locations there can be a seasonal variation in the conditions of the inlet feed water source 16. One such seasonal variation that can significantly effect a water purification system is inlet water temperature. As the temperature of the inlet water source 16 increases, a greater driving force through the membrane 20 exists and, as such, a greater permeate flow 24 will be achieved. Consequently, in order to optimize the efficiency of the water purification systems 10 under such conditions the inclusion of a flow restriction mechanism 25 within the permeate flow 24 may be desired as shown in conjunction with FIG. 2B. While such a flow restriction mechanism 25 may be any form of otherwise conventional flow restriction, whether a restriction orifice, a manual valve, or similar method, for purposes of enabling a most robust mechanism of optimizing the present invention shown herein is a permeate flow modulating valve 25 that can be modulated inversely proportional to inlet temperature T1 or directly proportional to inlet pressure P1, or otherwise modulated based upon measured flowrates of primary permeate flow 27a or primary concentrate flow 27b. However, it should be noted that a necessary limitation to the operation of a high efficiency water purification system 10 within the teachings of any embodiment of the present invention is the inclusion of some form of flow modulation stop limit to prevent total cessation altogether of primary permeate flow 24.

Figure 3A:
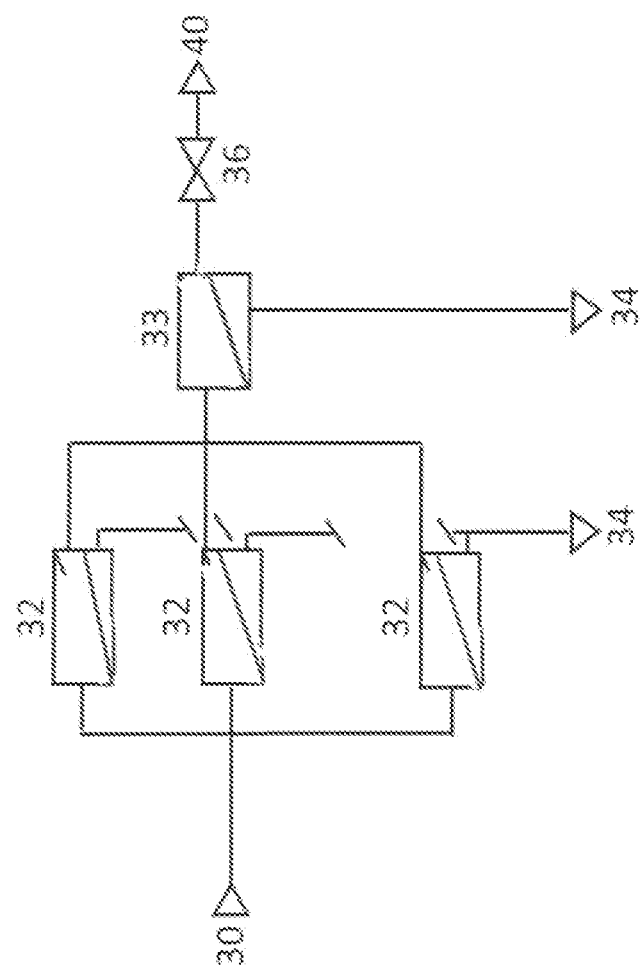
FIG. 3a is a process flow schematic of a concentrate recovery unit 14 for use in conjunction with the preferred embodiment of the present invention, and shown herein in a first alternate embodiment to that shown in FIG. 1 of the preferred invention.

In either variant (as in FIG. 2A or FIG. 2B), the primary reverse osmosis unit 12 will generate a final concentrate flow 28 that is discharged as a wastewater. The final concentrate flow 28 is anticipated as being operated typically at 30-60% (and up to 80%) of the total concentrate 22, depending on the feed water characteristics. The recovery is limited by sparingly soluble salts which can foul the reverse osmosis membranes. The balance is diverted as recovered concentrate flow 30 and is directed as the inlet feedstock of the concentrate recovery unit 14, such as shown in conjunction with FIG. 3a in which a concentrate recovery unit is shown in which plurality of primary thin film recovery membranes 32, herein shown as three in parallel with each other, and together are in series with a reverse osmosis vessel 33. As shown in FIG. 3a in a typical configuration, the recovered concentrate flow 30 is directed to an additional set of thin film composite membranes as concentrate recovery membranes 32. It is anticipated that a variable number of membranes 32 can be in fluid communication with the recovered concentrate flow 30 is a parallel fashion. To exemplify this, three such thin film recovery membranes 32 are shown in a parallel configuration as part of the concentrate recovery unit 14 of FIG. 3A. Similarly, as shown in FIG. 3B, an alternate, but equivalent configuration is shown in which a greater number of membranes 32 and reverse osmosis vessels 33 are utilized. As shown in each enablement, the permeate discharge from each recovery member 32 is collected in a common manifold and communicated to a reverse osmosis vessel 33 (with multiple reverse osmosis vessels 33 connected in parallel as shown in use as exemplified in FIG. 3B). Similarly, the concentrate discharge from each recovery member 32 is collected in a separate common manifold and communicated, with in common connection with the concentrate discharge of the reverse osmosis vessel 33, as a combined concentrate recovery permeate 34.

In any embodiment, the concentrate 30 is drawn from the primary RO unit upstream of the concentrate flow control valve 26 where the pressure is preferably between 100-600 psig, and typically between 200-300 psig. The concentrate recovery membranes 32 are arranged in an array such that the concentrate pressure P4 is adequate to provide the force required to drive the concentrate 30 through the recovery system membranes 32. The permeate 34 produced by the concentrate recovery system 14 is directed back to the feed of the primary RO unit 12; thereby, reducing the volume of raw feed water 16 required for system operation.

The concentrate recovery concentrate flow rate is controlled by a flow control valve 36 and is discharged as a wastewater 40. The concentrate recovery system is operated typically at 30-60%, and up to as much as 80% recovery depending on the feed water characteristics. The recovery is limited by sparingly soluble salts which can foul the reverse osmosis membranes. The percent recovery is established on a case by case basis depending on the feed water chemistry.

Figure 3C:
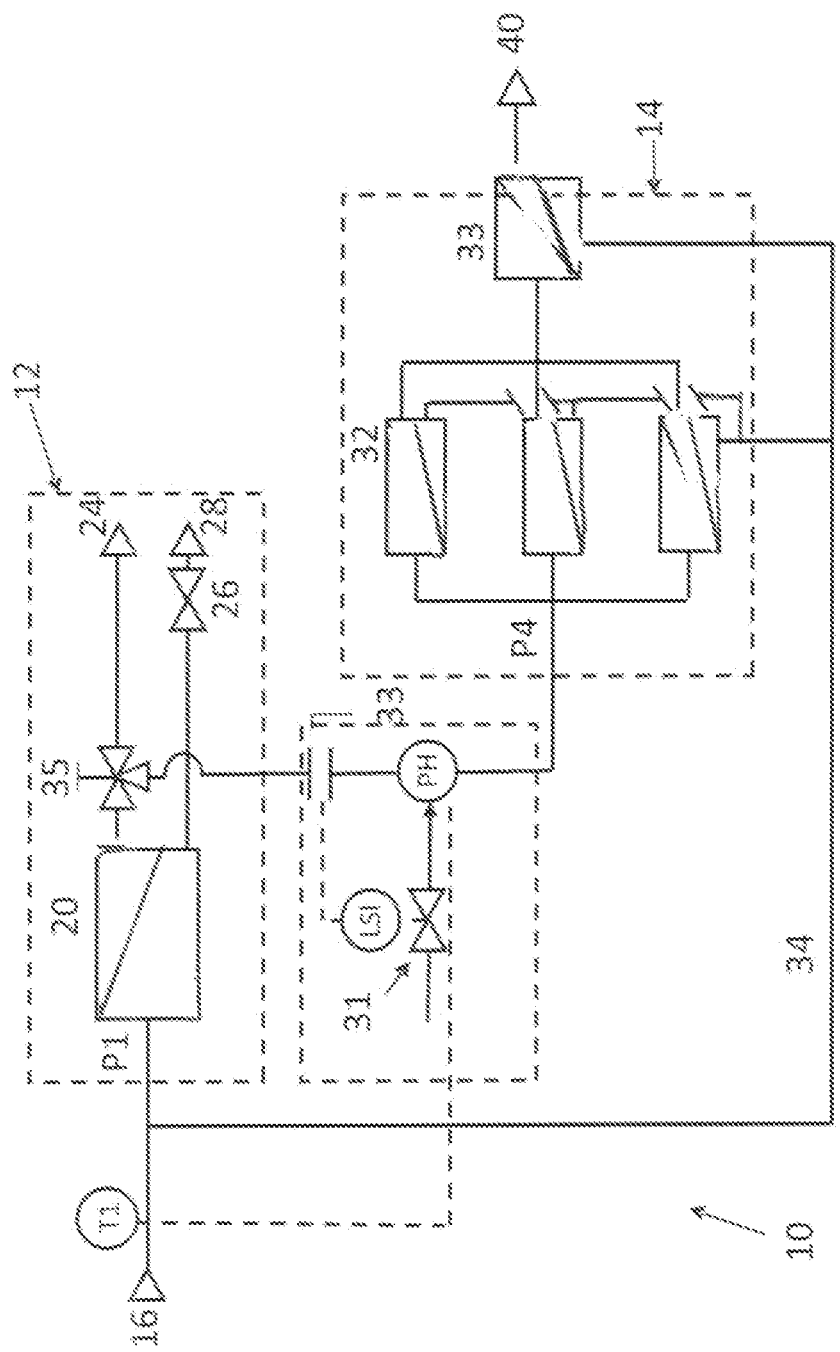
FIG. 3c is a detailed process flow diagram for the a concentrate recovery unit 14 for use in conjunction with the preferred embodiment shown in FIG. 1 and incorporating in situ systems for reduction of fouling of the concentrate recovery membranes 32.

In order to control this fouling and increase the overall recover through increased operational cycle time, protection of the membranes can be accomplished in situ through several means. As shown in FIG. 3c, shown in one anticipated means for decreasing membrane fouling may be through the direction injection of antiscalant or acidic chemicals in relatively small concentration into and in relative proportion with the primary concentrate discharge functioning as a secondary inlet to the concentrate recovery unit 14. Such antiscalant may be injected as a calculated and controlled function, generally shown as 31, and based upon determination of the Langelier Saturation Index (sometimes referred to as the Langelier Stability Index), or LSIO index of the water within the system. The LSIO Index is a calculated number used to predict the calcium carbonate stability of water and is an indication of whether the concentrate water 30 will precipitate, dissolve, or be in equilibrium with calcium carbonate. It is anticipated that the LSI controller 31 will calculate a predictive pH at which the concentrate water 30 would be saturated in calcium carbonate, referred to as pHs. The LSI is expressed as the difference between the actual system pH and the saturation pH:

$$LSI = pH(\text{measured}) - pHs$$

For LSI>0, water is super saturated and tends to precipitate a scale layer of CaCO3.

For LSI=0, water is saturated (in equilibrium) with CaCO3. A scale layer of CaCO3 is neither precipitated nor dissolved.

For LSI<0, water is under saturated and tends to dissolve solid CaCO3.

If the actual pH 33 of the water 30 is below the calculated saturation pH, the LSI is negative and the water has a very limited scaling potential. If the actual pH exceeds pHs, the LSI is positive, and being supersaturated with CaCO3, the water has a tendency to form scale. At increasing positive index values, the scaling potential increases. In practice, water with an LSI between −0.5 and +0.5 will not display enhanced mineral dissolving or scale forming properties. Water with an LSI below −0.5 tends to exhibit noticeably increased dissolving abilities while water with an LSI above +0.5 tends to exhibit noticeably increased scale forming properties.

It is also worth noting that the LSI is temperature sensitive. The LSI becomes more positive as the water temperature increases. This increase in temperature can cause scaling, and as a result antiscalant injection may be controlled relative to this increasing temperature and in light of the fluid flow rate, water pH or conductivity, or other adaptive or calculated factors in order to protect the secondary membranes 32 for fouling.

Such descaling of fouling prevention of the secondary membranes 32 can be an important activity in order to maximize overall recovery of the entire system 10 over a total operational time basis. Since downtime required to replace or clean fouled membranes 32 will result in a period of significantly decreased performance, the minimizing of the overall operational time of such events can result in improvements in overall recoveries in excess of 80%. As an alternate to or in conjunction with the injection of modulated antiscalant injection, an additional method of protection of secondary concentrate recovery membranes 30 may include an in situ "flush" of primary permeate flow 24 through the secondary recovery system 14. An example of such a clean-in-place permeate flush 35 is shown in FIG. 3c.

2. Examples of Operation Utilizing the Present Invention

Figure 4:
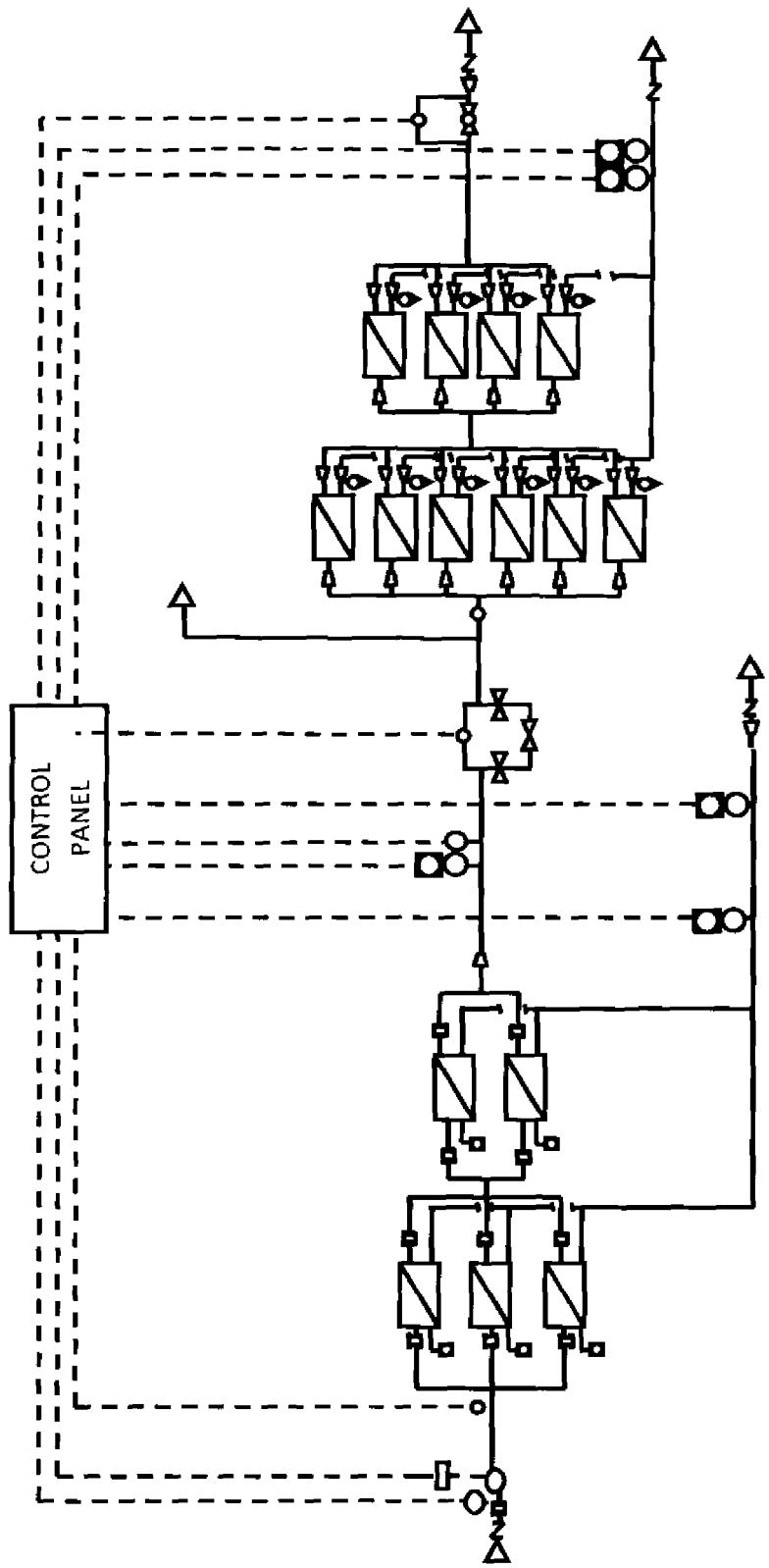
FIG. 4 is a piping and instrumentation diagram (P&ID) of a example utilizing the present invention and having a primary reverse osmosis with concentrate recovery.

In operation, the concentrate recovery unit utilizes pressure that is available as part of the normal operating parameters of the primary RO unit. No additional energy is required for the recovery process. The concentrate recovery system, as typically shown in FIG. 6A-6E, can be retrofitted onto existing RO units and incorporated on new RO installations. Further, as shown in conjunction with FIG. 4, a piping and instrumentation diagram (P&ID) of a example utilizing the present invention and having a primary reverse osmosis with concentrate recovery is shown in order to describe a non-limiting example of a configuration that may be maintained and the performance that may be achieved from the teaching of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A water purification system comprising:
a non-seawater feedwater source;
a primary reverse osmosis unit treating a first input and having a first permeate water discharge forming a product stream and a first concentrate discharge;
at least one secondary reverse osmosis unit in fluid communication with said first concentrate discharge without any additional pumping means and in which at least a portion of said first concentrate discharge is further separated into a second permeate water discharge and a second concentrate discharge;
a flow restriction mechanism within said first concentrate discharge; and
a flow modulation stop limit to prevent total cessation altogether of first concentrate discharge;
wherein both the entire said second permeate water discharge and said non-seawater feedwater source comprise said first input; and
wherein said first permeate water recovery is capable of continuous recovery of at least 80% of said non-seawater feedwater source; and
wherein soluble and sparingly soluble inorganic materials remain in solution in said first concentrate discharge and said second concentrate discharge.

2. The water purification system of claim 1, wherein said non-seawater feedwater source is selected from the group consisting of: municipal water sources; industrial water sources; brackish water sources; and tertiary water sources.

3. The water purification system of claim 2, wherein said primary reverse osmosis unit comprises at least one thin film recovery membrane, or cellulose acetate membrane, capable of operating in the hyper filtration range.

4. The water purification system of claim 3, wherein said secondary reverse osmosis unit comprising a plurality of composite reverse osmosis membrane modules arranged in parallel, and further comprising:
each said plurality of composite reverse osmosis membrane modules having a permeate discharge in combination with each other in fluid communication with and forming said second permeate water discharge, and wherein each module further has a concentrate discharge in combination with each other and forming said second concentrate discharge.

5. The water purification system of claim 4, wherein said secondary reverse osmosis unit further comprises at least one additional reverse osmosis stage in series for separating the collected said second concentrate discharge from said plurality of composite reverse osmosis membrane modules arranged in parallel.

6. The water purification system of claim 5, wherein said at least one additional reverse osmosis stage further comprises a plurality of additional reverse osmosis elements.

7. The water purification system of claim 2, wherein said feedwater source is pre-treated by filtering fouling materials known to be detrimental to RO membrane operation.

8. The water purification system of claim 3, further comprising a system for an in situ "flush" of a portion of said first permeate water discharge through the secondary reverse osmosis unit.

9. A water purification systems of claim 1, wherein said primary reverse osmosis unit is operated at a pressure in the range of 200-600 psig.

10. The water purification system of claim 9, wherein said first concentrate discharge is operated at a pressure in the range of 150-500 psig.

11. The water purification system of claim 1, wherein said flow restriction mechanism can be modulated inversely proportional to inlet temperature or directly proportional to inlet pressure, or otherwise modulated based upon measured flowrates of primary permeate flow or primary concentrate flow.

12. The water purification system of claim 1, further comprising means for decreasing membrane fouling through the direction injection of antiscalant or acidic chemicals in relatively small concentration into and in relative proportion with the primary concentrate discharge.

13. The water purification system of claim 12, wherein said means for decreasing membrane fouling further comprises injection of antiscalant as a calculated and controlled function based upon determination of the Langelier Saturation Index of the water within the system.

14. The water purification system of claim 12, further comprising a system for an in situ "flush" of primary permeate flow through the secondary reverse osmosis unit.

15. A process to recover a portion of the concentrate wastewater associated with the reverse osmosis unit for reducing the overall volume of concentrate wastewater requiring discharge/disposal by reusing the purified permeate of a concentrate recovery units in combination with a water source as RO feed water, said process comprising:
   a. obtaining an initial feed water inlet;
   b. pressurizing said feedwater and passed said feedwater through a thin film composite reverse osmosis membrane to create a separate first permeate flow and a first concentrate flow;
   c. restricting the first concentrate flow in a manner that prevents total cessation altogether of primary permeate flow;
   d. directing said first concentrate flow to at least a second thin film composite membranes functioning as concentrate recovery membranes, wherein said concentrate recovery membranes are arranged in an array such that the concentrate pressure is adequate to provide the force required to drive the concentrate through the recovery system membranes; and
   e. directing the permeate produced by the concentrate recovery system back to the feed of the primary RO unit;
thereby, reducing the volume of raw feed water required for system operation.

16. The process of claim 15, wherein a secondary concentrate flow rate from said at least a second thin film composite membranes functioning as concentrate recovery membranes is controlled by a second flow control valve and is discharged as a wastewater.

17. The process of claim 15, wherein said concentrate recovery system is operated at between 30-60% recovery depending on the feed water characteristics as limited by sparingly soluble salts which can foul the reverse osmosis membranes.

* * * * *